United States Patent Office 3,639,662
Patented Feb. 1, 1972

3,639,662
AZO DYES OF THE TRIAZINE SERIES
Geoffrey Griffiths and Cecil Vivian Stead, Manchester, England, assignors to Imperial Chemical Industries Limited, London, England
No Drawing. Filed Mar. 3, 1969, Ser. No. 804,020
Claims priority, application Great Britain, Mar. 7, 1968, 1,184/68
Int. Cl. C09b 62/08; D06p 1/02
U.S. Cl. 260—146 T          6 Claims

ABSTRACT OF THE DISCLOSURE

Reactive dyestuffs represented by the general formula:

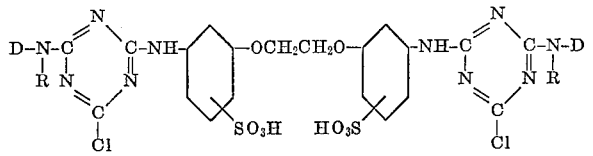

wherein R represents a hydrogen atom or an alkyl group, and

represents the radical of a water-soluble coloured compound containing a —NHR group. These dyes are distinguished by the high degree of fixation achieved during dyeing processes.

---

This invention relates to new reactive dyestuffs of the triazine series, useful for the colouration of cellulose textile materials.

The manufacture of reactive dyestuffs by condensing azo dyestuffs with cyanuric halides and then condensing two moles of the resulting dichloro-s-triazine derivative with a variety of diamines is described, for example, in the provisional specification of U.K. Pat. No. 854,432. The present invention is based on the observation that valuable cellulose-reactive dyestuffs can be obtained in an analogous manner by using diamino diphenoxy ethane disulphonic acid as the linking diamide.

According to the invention there are provided new reactive dyestuffs represented by the general formula:

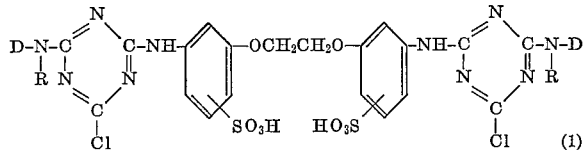

wherein R represents a hydrogen atom or an alkyl group, and

represents the radical of a water-soluble coloured compound containing a —NHR group.

In the above formula, the radical D can, for example, represent the radical of a water-soluble coloured compound of the azo, athraquinone or phthalocyanine series e.g. a mono- or bis-azo dyestuff which may or may not be metallised.

The amino groups in the depicted benzene rings may be in meta- or para-positions to each oxygen atom, the $SO_3H$ group in each can be positioned in any of the remaining sites in the nucleus. It is preferred, however, in general, that the NH groups should be in para position to the oxygen atoms and that the sulphonic acid groups should be in ortho positions to the oxygen atom.

Thus a preferred class of dyestuffs is that in which the linking group is a 4,4'-divalent diphenoxyethane-2,2'-disulphonic acid radical and D—NR— is the radical of a phenylazo naphthalene compound containing a NHR group and a plurality of water-solubilising groups, e.g. DNR represents a radical of the formula:

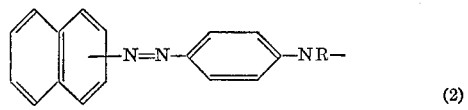

in which the naphthalene nucleus contains two or, preferably three sulphonic acid groups and the benzene nucleus can be further substituted e.g. by one or more methyl, methoxy, acetylamino and/or ureido groups; or a radical of the formula:

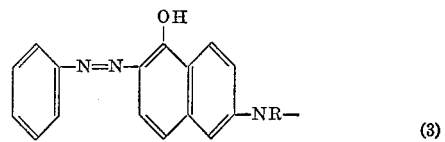

wherein the naphthalene nucleus contains at least one and preferably two sulphonic acid groups and the benzene nucleus can be substituted e.g. by one or more methyl, methoxy, acetylamino and/or sulphonic acid groups.

Such dyestuffs are distinguished by their value for use in dyeing by exhaustion methods, in which they offer a degree of fixation over a wide range of liquor-to-goods ratio not possessed by commercially-available reactive dyestuffs. At the same time, the new dyestuffs provide shades of very good light fastness, whereas previously known dyestuffs of similar structure are usually deficient in this property.

The invention also provides a process for manufacture of the new dyestuffs which comprises reacting cyanuric chloride, in either order, with one molecular proportion of a water-soluble dyestuff of the formula:

D—NHR          (4)

and with one-half molecular proportion of a diamino diphenoxyethane disulphonic acid.

The above process can conveniently be carried out by stirring a suspension of the cyanuric chloride in an aqueous medium with the dyestuff of Formula 4 at a temperature of 0 to 20° C. until one chlorine atom of the cyanuric chloride has been replaced by the radical of the dyestuff, then adding the diamine and continuing reaction at a slightly higher temperature, usually in the range 30 to 50° C. until a second halogen atom on the triazine nucleus has reacted with each amino group. Alternatively, the cyanuric chloride can be reacted first with the diamine at the lower temperature to form a bis(dichlorotriazine)derivative and then with the dyestuff at the higher temperature. The condensations are preferably carried out at a pH of from 4 to 7, adding an acid-binding agent to neutralise the hydrochloric acid as it is liberated during the reaction. When the reaction is complete the new reactive dyestuffs can be isolated by the usual techniques adopted for isolation of water-soluble reactive dyestuffs, for example, by salting out and filtration, or by spray-drying the reaction mixture in which the dyestuff has been formed. If desired, stabilisers, for example, alkali metal hydrogen phosphates, can be added.

As examples of diaminodiphenoxyethane disulphonic acids which may be used there may be mentioned: 4,4'-diaminodiphenoxyethane - 2,2' - disulphonic acid and 4,4'-diaminodiphenoxyethane-3,3'-disulphonic acid.

As examples of water-soluble dyestuffs of Formula 4 which may be used there may be mentioned the following classes:

(i) Anthraquinone compounds of the formula:

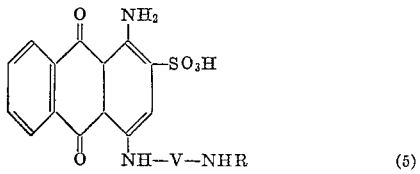

(5)

wherein the anthraquinone nucleus may contain an additional sulphonic acid group in the 5-, 6-, 7- or 8-position and V represents a bridging group which is preferably a divalent radical of the benzene series, for example phenylene, diphenylene or 4,4'-divalent stilbene or azobenzene radicals. It is preferred that V should contain one sulphonic acid group for each benzene ring present. R has the meaning stated above.

(ii) Monoazo compounds of the formula:

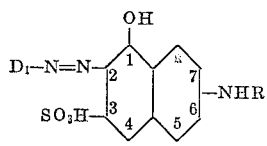

wherein $D_1$ represents a mono- or dicyclic aryl radical which is free from azo groups and NHR groups, the —NHR group is preferably attached to the 6-, 7- or 8- position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolyl/phenyl or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or napthyl radical, especially those which contain a —$SO_3H$ group in ortho position to the azo link; the phenyl radical may be further substituted for example, by halogen atoms such as chlorine, alkyl radicals such as methyl, acylamino groups such as acetyl-amino and alkoxy radicals such as methoxy.

(iii) Disazo compounds of Formula 6, wherein $D_1$ stands for a radical of the azobenzene, azonaphthalene or phenylazo-naphthalene series and the naphthalene nucleus is substituted by the NHR group, and optionally by sulphonic acid as in class (ii).

(iv) Mono- or disazo compounds of the formula:

$$D_1—N=N—D_2—NHR \qquad (7)$$

wherein $D_1$ stands for a radical as defined for class (ii) or class (iii) and $D_2$ is a 1:4-phenylene or a sulpho-1:4-naphthylene or a stilbene radical; the benzene nuclei in $D_1$ and $D_2$ may contain further substituents such as halogen atoms, or alkyl, alkoxy, carboxylic acid and acylamino groups.

(v) Mono or disazo compounds of the formula:

(8)

wherein $D_1$ represents an arylene radical such as a radical of the azobenzene, azonaphthalene or phenylazonaphthalene series, or, preferably, and at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(vi) Mono- or disazo compounds of the formula:

$$D_1—N=N—K_2—NHR \qquad (9)$$

wherein $D_1$ represents a radical of the types defined for $D_1$ in classes (ii) and (ii) above and $K_2$ represents the radical of an enolisable ketomethylene compound such as an acetoacetarylide or a 5-pyrazolone) having the —OH group in α-position to the azo group.

(vii) 1:1-metal complex, especially the copper complex, compounds of those dyes of Formulae 6, 8 and 9 (wherein $D_1$, K and $K_2$ have all the respective meanings stated) which contain a metallisable (for example, a hydroxy, lower alkoxy or carboxylic acid) group ortho- to the azo group in $D_1$.

(viii) Phthalocyanine compounds of the formula:

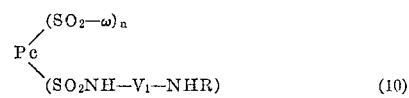

(10)

wherein Pc represents the phthalocyanine nucleus preferably of copper phthalocyanine, ω represents a hydroxy and/or a substituted or unsubstituted amino group, $V_1$ represents a bridging group, preferably an aliphatic, cycloaliphatic or aromatic bridging group, $n$ represents 1, 2 or 3.

(ix) Nitro dyestuffs of the formula:

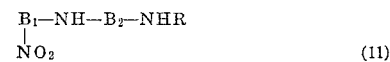

(11)

wherein $B_1$ and $B_2$ represent monocyclic aryl nuclei, the nitro group in $B_1$ being ortho to the NH group.

As examples of compounds of classes (i) to (ix) there may be mentioned the following:

In Class (i)

1-amino-4-(4'-aminoanilino)anthraquinone-2,2'-disulphonic acid,
1-amino-4-(4'-methylaminoanilino)anthraquinone-2:3'-disulphonic acid,
1-amino-4-(3'-amino-2':4':6'-trimethylanilino)anthraquinone-2,5'-disulphonic acid, In Class (ii)

6-amino-1-hydroxy-2-(2'-sulphophenylazo)naphthalene-3-sulphonic acid,
8-amino-1-hydroxy-2-(2'-sulphophenylazo)naphtalene-3:6-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)naphthalene-3:6-disulphonic acid,
8-amino-1-hydroxy-2:2'-azonaphthalene-1':3:5'-6-tetrasulphonic acid,
6-amino-1-hydroxy-2-(4'-acetylamino-2'-sulphophenylazo)naphthalene-3-sulphonic acid,
6-methylamino-1-hydroxy-2-(4'-methoxy-2'-sulphophenyl-azo)naphthalene-3-sulphonic acid,
8-amino-1-hydroxy-2-phenylazonaphthalene-3:6-disulphonic acid,
8-amino-1-hydroxy-2:2'-azonaphthalene-1':3:6-trisulphonic acid,
6-amino-1-hydroxy-2(4'-methoxy-2'-sulphophenylazo) naphthalene-3-sulphonic acid,
8-amino-1-hydroxy-2:2'-azonaphthalene-1':3:5'-trisulphonic acid,
6-amino-1-hydroxy-2:2'-azonaphthalene-1',3,5'-trisulphonic acid, 6-methylamino-1-hydroxy-2:2′-azonaphthalene-1′:3:5′-trisulphonic acid,
7-amino-1-hydroxy-2:2′-azonaphthalene-1′:3-disulphonic acid,
8-amino-1-hydroxy-2-(4′-hydroxy-3′-carboxyphenylazo) naphthalene-3:6-disulphonic acid,
6-amino-1-hydroxy-2-(4′-hydroxy-3′-carboxyphenylazo)-naphthalene-3:5-disulphonic acid, In Class (iii)

8-amino-1-hydroxy-2-[4′-(2″-sulphophenylazo)-2′-methoxy-5′-methylphenylazo]naphthalene-3:6-disulphonic acid,
4:4′-bis(8″-amino-1‴-hydroxy-3‴:6″-disulpho-2″-naphthylazo)-3:3′-dimethoxydiphenyl,
6-amino-1-hydroxy-2-[4′-(2″-sulphophenylazo)-2′-methoxy-5′-methylphenylazo]naphthalene-3:5-disulphonic acid, In Class (iv)

2-(4′-amino-2′-methylphenylazo)naphthalene-4:8-disulphonic acid,
2-(4′-amino-2′-acetylaminophenylazo)naphthalene-5:7-disulphonic acid,
2-(4′-amino-2′-ureidophenylazo)naphthalene-3:6:8-trisulphonic acid,
4-nitro-4′-(4″-methylaminophenylazo)stilbene-2:2′-disulphonic acid,
4-nitro-4′-(4″-amino-2″-methyl-5″-methoxyphenylazo) stilbene-2:2′-disulphonic acid,
2-(4′-amino-2′-acetylaminophenylazo)-naphthalene-4:8-disulphonic acid,
4-amino-2-methylazobenzene-2′:5′-disulphonic acid,
4-[4′-(2″,5″-disulphophenylazo)-2′,5′-dimethylphenylazo]-1-naphthylamine-8-sulphonic acid,
4-[4′-(2″,5″,7″-trisulphonaphth-1-zylazo)-2′,5′-dimethylphenylazo]-1-naphthylamine-6-sulphonic acid,
4-[4′-(2″,5″,7″-trisulphonaphth-1-ylazo)-2′,5′-dimethyl phenylazo]-1-naphthylamine-7-sulphonic acid,
4-[4′-(2″,5″,7″-trisulphonaphth-1-ylazo)-naphth-1-ylazo]-1-naphthylamine-6-sulphonic acid,
4-[4′-(2″,5″-disulphophenylazo)-6′-sulphonaphth-1-ylazo]-1-naphthylamine-8-sulphonic acid,
4-[4′-(4″-sulphophenylazo)-2′-sulphophenylazo]-1-naphthylamine-6-sulphonic acid, In Class (v)

1-(2′,5′-dichloro-4′-sulphophenyl)-3-methyl-4-(3″-amino-4″-sulphophenylazo)-5-pyrazolone,
1-(4′-sulphophenyl)-3-carboxy-4-(4″-amino-3″-sulphophenylazo)-5-pyrazolone,
1-(2′-methyl-5′-sulphophenyl)-3-methyl-4-(4″-amino-3″-sulphophenylazo)-5-pyrazolone,
1-(2′-sulphophenyl)-3-methyl-4-(3″-amino-4″-sulphophenylazo)-5-pyrazolone,
4-amino-4′-(3″-methyl-1″-phenyl-4″-pyrazol-5″-onylazo)stilbene-2:2′-disulphonic acid,
4-amino-4′-(2″-hydroxy-3″,6″-disulpho-1″-naphthylazo)stilbene-2:2′-disulphonic acid,
8-acetylamino-1-hydroxy-2-(3′-amino-4′-sulphophenylazo) naphthalene-3:6-disulphonic acid,
7-(3′-sulphophenylamino)-1-hydroxy-2-(4′-amino-2′-carboxyphenylazo)-naphthalene-3-sulphonic acid,
8-phenylamino-1-hydroxy-2-(4′-amino-2′-sulphophenylazo)naphthalene-3:6-disulphonic acid,
6-acetylamino-1-hydroxy-2-(5′-amino-2′-sulphophenylazo)-naphthalene-3-sulphonic acid,
6-ureido-1-hydroxy-2-(5′-amino-2′-sulphophenylazo)-naphthalene-3-sulphonic acid,
8-benzoylamino-1-hydroxy-2-(5′-amino-2′-sulphophenylazo)naphthalene-3:6-disulphonic acid,
1-(4′:8′-disulphonaph-2′-yl)-3-methyl-4-(5″-amino-2″-sulphophenylazo)-5-pyrazolone,
1-(2′-sulphophenyl)-3-carboxy-4-(5″-amino-2″-sulphophenylazo)-5-pyrazolone,
1-(2′:5′-dichloro-4′-sulphophenyl)-3-methyl-4-(5″-amino-2″-sulphophenylazo)-5-pyrazolone, In Class (vi)

1-(3′-aminophenyl)-3-methyl-4-(2′:5′-disulphophenylazo)-5-pyrazolone,
1-(3′-aminophenyl)-3-carboxy-4-(2′-carboxy-4′-sulphophenylazo)-5-pyrazolone,
4-amino-4′-[3″-methyl-4″-(2‴:5‴-disulphophenylazo)-(1″-pyrazol-5′-onyl]stilbene-2:2-disulphonic acid,
1-(3-aminophenyl)-3-carboxy-4-[4″-(2‴:5‴-disulphophenylazo)-2″-methoxy-5″-methylphenylazo]-5-pyrazolone, In Class (vii)

The copper complex of 8-amino-1-hydroxy-2-(2′-hydroxy-5′-sulphophenylazo)naphthalene-3:6-disulphonic acid,
The copper complex of 6-amino-1-hydroxy-2-(2′-hydroxy-5′-sulphophenylazo)naphthalene-3-sulphonic acid,
The copper complex of 6-amino-1-hydroxy-2-(2′-hydroxy-5′-sulphophenylazo)naphthalene-3:5-disulphonic acid,
The copper complex of 8-amino-1-hydroxy-2-(2′-hydroxy-3′-chloro-5′-sulphophenylazo)naphthalene-3:6-disulphonic acid,
The copper complex of 8-amino-1-hydroxy-2-[4′-(2″-sulphophenylazo)-2′-methoxy-5′-methylphenylazo] naphthalene-3:6-disulphonic acid,
The copper complex of 6-amino-1-hydroxy-2-[4′-(2″:5″-disulphophenylazo)-2′-methoxy-5′-methylphenylazo] naphthalene-3-disulphonic acid,
The copper complex of 1-(3′-amino-4′-sulphophenyl)-3-methyl-4-[4″-(2‴:5‴-disulphophenylazo)-2″-methoxy-5″-methylphenylazo]-5-pyrazolone,
The copper complex of 7-(4′-amino-3′-sulphoanilino)-1-hydroxy-2-[4″-(2‴:5‴-disulphophenylazo)-2″-methoxy-5″-methylphenylazo]naphthalene-3-sulphonic acid,
The copper complex of 6-(4′-amino-3′-sulphoanilino)-1-hydroxy-2-(2″-carboxyphenylazo)naphthalene-3-sulphonic acid, In Class (viii)

3-(3′-amino-4′-sulphophenyl)sulphamyl copper phthalocyanine-tri-3-sulphonic acid,
4-(3′-amino-4′-sulphophenyl)sulphamyl copper phthalocyanine-tri-4-sulphonic acid,
3-(3′- or 4′-aminophenyl)sulphamyl copper phthalocyanine-3-sulphonamide-di-3-sulphonic acid, In Class (ix)

4-amino-2′-nitro- diphenylamine-3:4′-disulphonic acid.

The azo dyestuffs of the invention can also be prepared in many cases by a coupling process. Thus, by condensing cyanuric chloride with one half-mole of the diaminodiphenoxyethane disulphonic acid and then with one molecular proportion of an aromatic diamine, there is obtained a tetrazotisable aromatic diamine of the general formula:

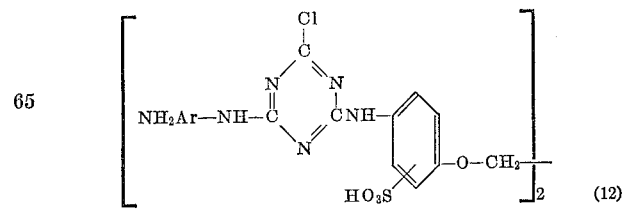

(12)

which can be tetrazotised and coupled with two moles of a coupling component, e.g. a phenol, naphthol, aminonaphthol, pyrazolone or aromatic amine.

Alternatively, the cyanuric chloride can be condensed with one-half mole of the diamino-diphenoxyethanedisulphonic acid and then with one molecular proportion of an aromatic compound which contains an acylatable amino group and which after condensation is still capable of coupling with a diazonium compound, and coupling the resultant product with two moles of a diazotised aromatic amine.

Examples of suitable aromatic compounds useful for condensation in this connection include aminophenols, aminonaphthols and aromatic diamines.

The invention also provides a process for manufacture of the new dyestuffs in which the NR group is a substituent on a group of the formula:

present in D, $R_3$ representing H, alkyl or hydroxyalkyl and $V_2$ an alkylene, cycloalkylene, aryl or alkaryl radical which may be substituted, which comprises reacting a coloured compound having a sulphonic acid chloride group and preferably 1 or more sulphonic acid groups with one-half of one molecular proportion of a diamine of the formula:

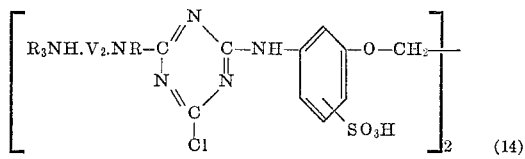

wherein R, $R_3$ and $V_2$ have the meanings stated above.

This process can conveniently be carried out by stirring the reactants in an aqueous medium in the presence of an acid-binding agent, which, to avoid hydrolysis of the chlorine atoms on the triazine nuclei of the diamine, is preferably added at a rate which maintains the mixture at a pH of from 6 to 8. Suitable acid binding agents for this purpose include, for example, sodium hydroxide, carbonate and bicarbonate or the corresponding potassium compounds.

As examples of coloured compounds which may be used, there may be mentioned the chlorosulphonation products of copper phthalocyanine or 1,4 - diarylaminoanthraquinones or the products obtained by treating azo, anthraquinone or copper phthalocyanine compounds containing sulphonic acid groups with reactants capable of converting $SO_3H$ to $SO_2Cl$ e.g. chlorosulphonic acid, thionyl chloride, phosphorus pentachloride and phosphorus trichloride.

Compounds of Formula 14 can be obtained by reacting together a diamine of the formula:

$$R_3NHV_2NHR \qquad (15)$$

wherein R, $R_3$ and $V_2$ have the meanings stated above with a diaminodiphenoxyethane disulphonic acid, and cyanuric chloride.

As examples of diamines of Formula 15 there may be mentioned ethylene and hexamethylene diamines, N-β-hydroxy-ethyl-ethylene diamine, diethylene triamine, 1,4-diamino cyclohexane, m- and p-amino-benzylamines and m- and p-phenylene diamines and their mono- and di-sulphonic acids.

The new reactive dyestuffs are valuable for colouring cellulose textile materials, for example, textile materials comprising natural or regenerated cotton. For colouring such materials, the new dyestuffs are preferably applied, either by a printing but preferably a dyeing process, to the cellulose textile material in conjunction with a treatment with an acid-binding agent, e.g. caustic soda, sodium carbonate phosphate, silicate or bicarbonate, which may be applied to the cellulose textile material before, during or after the application of the dyestuff. When so applied to the new dyestuffs react with the cellulose and yield shades possessing excellent fastness to washing.

The invention may be illustrated but is not limited by the following example in which parts are by weight:

EXAMPLE 1

A solution of 3.9 parts of cyanuric chloride in 25 parts of acetone was run into an ice cold solution of 12.2 parts of the trisodium salt of 6-(1',5'-disulphonaphth-2'-ylazo)-2-methylamino-5-naphthol-7-sulphonic acid in 500 parts of water followed by 20 parts of a N solution of sodium hydroxide added as required to keep the solution neutral. A solution of 4.5 parts of the disodium salt of 4,4'-diaminodiphenyloxyethane - 2,2'-disulphonic acid in 100 parts of water was added and the mixture was heated at 30° C. whilst 24 parts of N sodium hydroxide solution were added to keep the solution neutral. 140 parts of sodium chloride were added and the precipitate filtered off and dried. The dyestuff so obtained is an orange powder; on analysis it is found to contain 2.05 atoms of organically bound chlorine per molecule.

The dyestuff so obtained, when applied to cellulosic textile materials in the presence of an acid-binding agent yields reddish-orange shades of excellent fastness to light and wet treatments.

The fixation of the above dyestuff was measured on cotton and viscose rayon materials by dyeing at 5:1 and 20:1 liquor-to-goods ratios at 90° C. as follows:

An amount of dyestuff corresponding to $\frac{1}{2000}$ mole was dissolved in water and made up to the appropriate volume for a 5:1 or 20:1 dyeing. Common salt at the rate of 60 g./l. was added and the solution was heated to 80° C. The material (a 5 g. hank in the case of a 20:1 dyeing of cotton, piece material in the other three cases) was added and dyed for 30 minutes at 80° C. Sodium carbonate at the rate of 20 g./l. was added and dyeing was continued for one hour at 80° C. The material was removed from the dye liquor and washed in water (20:1 liquor to goods) at 80° C. for 30 minutes.

The relative amounts of dye in the fresh dye liquor, exhausted dye liquor and washing water were measured at $\lambda_{max}$. by an absorption spectrophotometer and gave the following amounts of fixation:

| Material | Liquor to goods ratio | |
|---|---|---|
| | 5:1 | 20:1 |
| Cotton, percent | 83 | 75 |
| Viscose rayon, percent | 92 | 89 |

Similar dyeings using an amount of dye corresponding to $\frac{1}{600}$ mole and salt at the rate of 100 g./l. gave the following results:

| Material | Liquor to goods ratio | |
|---|---|---|
| | 5:1 | 20:1 |
| Cotton, percent | 83 | 73 |
| Viscose rayon, percent | 96 | 91 |

The following table gives further examples of dyestuffs of the invention which may be obtained when the 12.2 parts of the trisodium salt of 6-(1',5'-disulphonaphth-2'-ylazo)-2-methylamino-5-naphthol-7-sulphonic acid used in Example 1 is replaced by the equivalent amount of the dyestuff listed in Column II of the table. Column III gives the shade obtained when the dyestuff is applied to cellulosic textile materials in the presence of an acid-binding agent.

| I | II | III |
|---|---|---|
| Example: | | |
| 2 | Trisodium salt of 2-(4'-amino-2'-ureido-phenylazo)naphthalene-3:6:8-trisulphonic acid. | Yellow. |
| 3 | Trisodium salt of 1-(4'-sulphophenyl)-4-(5''-amino-2''-sulphophenylazo)-3-carboxy-5-pyrazolone. | Greenish-yellow. |
| 4 | Disodium salt of 1-(2':5'-dichloro-4'-sulphophenyl)-4-(5''-amino-2''-sulphophenylazo)-3-methyl-5-pyrazolone. | Do. |
| 5 | Disodium salt of 7-phenylazo-1-amino-8-naphthol-3,6-disulphonic acid. | Blue-red. |

TABLE—Continued

| I | II | III |
|---|---|---|
| 6 | Trisodium salt of 7-(2'-sulphophenylazo)-1-amino-8-naphthol-3,6-disulphonic acid. | Blue-red. |
| 7 | Trisodium salt of 4-[4'-(2'':5''-disulphophenylazo)-2',5'-dimethylphenylazo]-1-naphthylamine-8-sulphonic acid. | Orange. |
| 8 | Trisodium salt of the copper complex of 7-(2'-hydroxy-3'-chloro-5'-sulphophenylazo)-1-amino-8-naphthol-3,6-disulphonic acid. | Purple. |
| 9 | Trisodium salt of the copper complex of 6-(2'-hydroxy-3',5'-disulphophenylazo)-2-methylamino-5-naphthol-7-sulphonic acid. | Rubine. |
| 10 | Tetrasodium salt of the copper complex of 6-(2'-hydroxy-3':5'-disulphophenylazo)-2-amino-5-naphthol-1,7-disulphonic acid. | Do. |
| 11 | Disodium salt of 1-amino-4-(4'-aminoanilino)anthraquinone-2,3'-disulphonic acid. | Greenish-blue. |
| 12 | Disodium salt of 1-amino-4-(4'-methylaminoanilino)anthraquinone-2,3'-disulphonic acid. | Blue. |
| 13 | Disodium salt of 1-amino-4-(3'-aminoanilino)anthraquinone-2,4'-disulphonic acid. | Do. |
| 14 | Disodium salt of 1-amino-4-(3'-amino-2'-,4',6'-trimethylanilino)anthraquinone-2,5'-disulphonic acid. | Reddish-blue. |
| 15 | Disodium salt of 6-amino-1-hydroxy-2-(2'-sulphophenylazo)naphthalene-3-sulphonic acid. | Orange. |
| 16 | Trisodium salt of 6-amino-1-hydroxy-2-(2',5'-disulphophenylazo)-naphthalene-3-sulphonic acid. | Do. |
| 17 | Disodium salt of 6-methylamino-1-hydroxy-2-(2'-sulphophenylazo)-naphthalene-3-sulphonic acid. | Do. |
| 18 | Disodium salt of 7-methylamino-2-(4'-methoxy-2'-sulphophenylazo)-1-naphthol-3-sulphonic acid. | Red. |
| 19 | Trisodium salt of 8-(3'-aminobenzoyl-amino)-2-(2'-sulphophenylazo)-1-naphthol-3,6-disulphonic acid. | Blue-red. |
| 20 | Tetrasodium salt of 8-amino-1-hydroxy-2,2'-azonaphthalene-1',3,5',6-tetrasulphonic acid. | Do. |
| 21 | Trisodium salt of 8-amino-1-hydroxy-2,2'-azonaphthalene-1',3,6-trisulphonic acid. | Do. |
| 22 | Disodium salt of 6-amino-2-(4'-methoxy-2'-sulphophenylazo)-1-naphthol-3-sulphonic acid. | Scarlet. |
| 23 | Disodium salt of 6-methylamino-2-4'methoxy-2'-sulphophenylazo)-1-naphthol-3-sulphonic acid. | Do. |
| 24 | Trisodium salt of 6-amino-1-hydroxy-2,2'-azonaphthalene-1',3,5'-trisulphonic acid. | Reddish-orange. |
| 25 | Trisodium salt of 7-amino-1-hydroxy-2,2'-azonaphthalene-1',3,5'trisulphonic acid. | Red. |
| 26 | Tetrasodium salt of 6-amino-1-hydroxy-2,2'-azonaphthalene-1',3,5,5'-tetrasulphonic acid. | Reddish-orange. |
| 27 | Trisodium salt of 8-amino-2-[4'-(2''-sulphophenylazo)-2'-methoxy-5'-methylphenylazo]-1-naphthol-3,6-disulphonic acid. | Navy-blue. |
| 28 | Disodium salt of 2-(4'-amino-2'methyl-phenylazo)naphthalene-4,8-disulphonic acid. | Yellow. |
| 29 | Disodium salt of 2-(4'-amino-2'-acetyl-aminophenylazo)naphthalene-5,7-disulphonic acid. | Do. |
| 30 | Disodium salt of 4-nitro-4'-(4''-methylaminophenylazo)stilbene-2,2'-disulphonic acid. | Do. |
| 31 | Tetrasodium salt of 4-[4'-(2'',5'',7''-trisulphonaphth-1'-ylazo)-2,5'-dimethylphenylazo]-1-naphthylamine-6-sulphonic acid. | Yellow-brown. |
| 32 | Trisodium salt of 4-[4'-(4''-sulphophenylazo)-2'-sulphophenylazo]-1-naphthylamine-6-sulphonic acid. | Orange-brown. |
| 33 | Trisodium salt of 1-(4'-sulphophenyl)-3-carboxy-4-(4''-amino-3''-sulphophenylazo)-5-pyrazolone. | Yellow. |
| 34 | Trisodium salt of 8-acetylamino-2-(3'-amino-4'-sulphophenylazo)-1-naphthol-3,6-disulphonic acid. | Red. |
| 35 | Trisodium salt of 8-phenylamino-2-(4'-amino-2'-sulphophenylazo)-1-naphthol-3,6-disulphonic acid. | Blue. |
| 36 | Disodium salt of 6-ureido-2-(5'-amino-2'-sulphophenylazo)-1-naphthol-3-sulphonic acid. | Orange. |
| 37 | Trisodium salt of 8-benzoylamino-2-(5'-amino-2'-sulphophenylazo)-1-naphthol-3,6-disulphonic acid. | Blue-red. |
| 38 | Trisodium salt of 1-(4',8'-disulphonaphth-2'-yl)-3-methyl-4-(5''-amino-2''-sulphophenylazo)-5-pyrazolone. | Yellow. |
| 39 | Trisodium salt of 1-(2'-methyl-3'-amino-5'-sulphophenyl)-3-carboxy-4-[2''-sulphophenylazo]-5-pyrazolone. | Do. |
| 40 | Trisodium salt of the copper complex of 6-amino-2-(2'-hydroxy-5'-sulphophenylazo)-1-naphthol-3,5-disulphonic acid. | Rubine. |
| 41 | Trisodium salt of the copper complex of 6-methylamino-2-[4'-(2'',5''-disulphophenylazo)-2'-methoxy-5'-methylphenylazo]-1-naphthol-3-sulphonic acid. | Navy-blue. |
| 42 | Trisodium salt of the copper complex 8-amino-1,2'-dihydroxy-1',2-azonaphthalene-3,4',6-trisulphonic acid. | Blue. |
| 43 | Tetrasodium salt of the copper complex of 8-amino-1,1'-dihydroxy-2,2'-azonaphthalene-3,4',6,8'-tetra sulphonic acid. | Do. |
| 44 | Trisodium salt of the copper complex of 8-amino-2-(2'-hydroxy-3'-sulpho-5'-aminophenylazo)-1-naphthol-5,7-disulphonic acid. | Do. |
| 45 | Trisodium salt of the copper complex of 8-amino-2-(2'-hydroxy-4'-sulpho-6'-aminonaphth-1'-ylazo)-1-naphthol-5,7-disulphonic acid. | Do. |
| 46 | Trisodium salt of the copper complex of 6-(4'-amino-3'-sulphophenylamino)-2-(2''-hydroxy-3''-nitro-5''-sulphophenylazo)-1-naphthol-3-sulphonic acid. | Purple. |
| 47 | Disodium salt of 4-amino-2'-nitrodiphenyl-amine-3,4'-disulphonic acid. | Yellow. |
| 48 | Pentasodium salt of 8-amino-7-(2',5'-disulphophenylazo)-2-(5''-amino-2''-sulphophenylazo)-1-naphthol-3,6-disulphonic acid. | Navy-blue. |
| 49 | Trisodium salt of 2-amino-1-(4'-amino-2',5'-disulphophenylazo)-8-naphthol-6-sulphonic acid. | Blue. |
| 50 | Tetrasodium salt of 3-(3'-amino-4'-sulphophenyl)sulphamyl copper phthalocyanine-trisulphonic acid. | Turquoise. |

The fixation of the dyestuff of Example 2 above, measured as described in Example 1, was:

at M/2000:

| Material | Liquor to goods ratio | |
|---|---|---|
| | 5:1 | 20:1 |
| Cotton, percent | 94 | 89 |
| Viscose rayon, percent | 97 | 96 | at M/600:

| Material | Liquor to goods ratio | |
|---|---|---|
| | 5:1 | 20:1 |
| Cotton, percent | 92 | 80 |
| Viscose rayon, percent | 97 | 95 |

EXAMPLE 51

A solution of 3.7 parts of cyanuric chloride in 30 parts of acetone is run into an ice cold solution of 4.5 parts of the disodium salt of 4,4' - diaminodiphenoxyethane-3,3'-disulphonic acid in 100 parts of water. 20 parts of a N solution of sodium hydroxide are subsequently added to neutralize generated acidity. A solution of 9.3 parts of the disodium salt of the disodium salt of 2-(4'-amino-2'-methylphenylazo)naphthalene-4,8-disulphonic acid in 200 parts of water is added and the mixture stirred and heated for 20 hours at 35° C. whilst 20 parts of a N solution of sodium hydroxide are added to keep the solution neutral. 100 parts of potassium chloride are then added and the precipitate is filtered off and dried at 50° C.

The dyestuff so obtained is a yellow powder which when applied to cellulosic textile materials in the presence of acid binding agents yields yellow shades of excellent fastness to light and wet treatments.

EXAMPLE 52

A solution of 3.7 parts of cyanuric chloride in 30 parts of acetone is run into an ice cold solution of 4.5 parts of the disodium salt of 4,4'-diaminodiphenoxyethane-2,2'-disulphonic acid in 100 parts of water. 20 parts of a N solution of sodium hydroxide are subsequently added to neutralize generated acidity. A solution of 4.2 parts of the monosodium salt of 2,4-diaminobenzene sulphonic acid in 100 parts of water is added and the mixture stirred and heated for 20 hours at 35° C. whilst 20 parts of a N solution of sodium hydroxide are added to neutralize generated acidity. The solution is then cooled to 0° C. and 25 parts of a 2 N solution of hydrochloric acid added followed by 10 parts of a 2 N solution of sodium nitrite.

After 30 minutes excess nitrous acid is destroyed by the addition of sulphamic acid and a solution of 6.75 parts of the disodium salt of 1-(4'-sulphophenyl)-3-carboxy-5-pyrazolone in 100 parts of water is added. Sufficient N sodium hydroxide is added to raise the pH to 7 and after 1 hour, 100 parts of potassium chloride are added and the precipitated dye is filtered off and dried to 50° C.

The yellow powder so obtained is analogous in properties to the dyestuff described in Example 3.

EXAMPLE 53

A solution of 3.7 parts of cyanuric chloride in 30 parts of acetone is run into an ice cold solution of 4.5 parts of the disodium salt of 4,4'-diaminodiphenoxyethane-2,2'-disulphonic acid in 100 parts of water. 20 parts of a N solution of sodium hydroxide are subsequently added to neutralize generated acidity. A solution of 5.2 parts of the monosodium salt of 2-amino-5-naphthol-7-sulphonic acid in 100 parts of water is added and the mixture stirred for 4 hours at 35° C. whilst 20 parts of a N solution of sodium hydroxide are added to neutralize generated acidity. The solution is cooled to 0° C. and a solution of the diazonium salt derived from 5.9 parts of the disodium salt of aniline-2,5-disulphonic acid in 100 parts of water is then added followed by sufficient N sodium hydroxide to raise the pH to 7. The solution is stirred for 1 hour and 100 parts of potassium chloride added. The precipitated orange dyestuff is filtered off and dried at 50° C. When applied to cellulosic textile materials in the presence of an acid binding agent it yields orange shades of excellent fastness to light and wet treatments.

We claim:

1. A reactive dyestuff represented by the general formula:

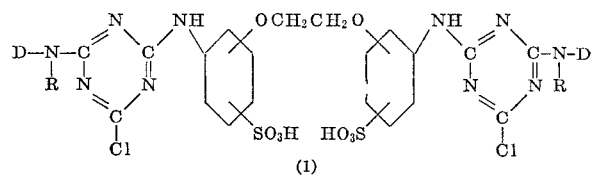

(1)

wherein R represents H or $CH_3$ and DNR— represents the radical of a water-soluble coloured compound selected from the class consisting of (a) monoazo dye radical of the formula:

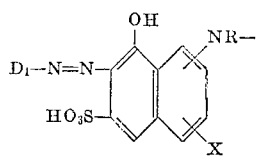

wherein $D_1$ is selected from 1-sulpho-2-naphthyl, 1,5-disulpho-2-naphthyl, 2-sulphophenyl and 4-methoxy-2-sulphophenyl, and X is H or $SO_3H$;

(b) monoazo dye radical of the formula:

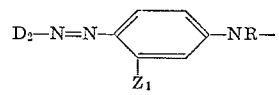

wherein $D_2$ is a disulpho- or trisulphonaphth-2-yl radical, $Z_1$ is selected from $CH_3$, $NHCONH_3$ and $NHCOCH_3$:

(c) monoazo dye radical of the formula:

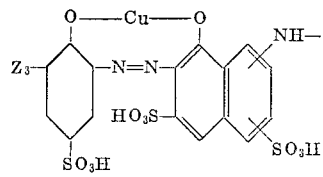

wherein $Z_2$ is selected from H, Cl and $SO_3H$; and (d) monoazo dye radical of the formula:

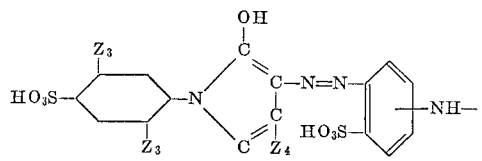

wherein $Z_4$ is $CH_3$ or $CO_2H$ and $Z_3$ is H or Cl.

2. A dyestuff as claimed in claim 1 wherein the NH groups on the benzene nuclei are in para position to the oxygen atoms and the sulphonic acid groups are in ortho positions to the oxygen atoms.

3. A dyestuff according to claim 1 wherein DNR— represents a monoazo dye radical (a).

4. A dyestuff according to claim 1 wherein DNR— represents a monoazo dye radical (b).

5. A dyestuff according to claim 1 wherein DNR— represents a monoazo dye radical (c).

6. A dyestuff according to claim 1 wherein DNR— represents a monoazo dye radical (d).

References Cited

UNITED STATES PATENTS 3,454,551  7/1969  Mangini et al. _____ 260—153

CHARLES B. PARKER, Primary Examiner

D. M. PAPUGA, Assistant Examiner

U.S. Cl. X.R.

260—147, 148, 151, 153, 158, 162, 186, 190, 191, 194 198, 199, 249, 314.5, 374; 8—51